United States Patent [19]

Brosow et al.

[11] 3,859,508
[45] Jan. 7, 1975

[54] METHOD OF CONTROL OF LEGITIMACY SAFE AGAINST FORGERY

[75] Inventors: Jorgen Brosow, Hof; Erik Furugard, Anieres, Switzerland

[73] Assignee: Dasy Inter S.A., Geneva, Switzerland

[22] Filed: May 30, 1973

[21] Appl. No.: 365,073

[30] Foreign Application Priority Data
Jan. 24, 1973  Sweden ................................ 948/73
Apr. 4, 1973   Sweden .............................. 4728/73

[52] U.S. Cl. ......... 235/61.7 B, 221/2, 235/61.11 D, 235/61.12 M, 340/149 A, 340/172.5
[51] Int. Cl. ...... G07f 7/02, G06k 5/02, G06k 7/08, G06k 19/06
[58] Field of Search ............. 235/61.7 B, 61.12 M, 235/61.12 N, 61.11 E, 61.11 D; 221/2; 178/22; 340/172.5, 149 A; 250/219 D

[56] References Cited
UNITED STATES PATENTS

| | | | |
|---|---|---|---|
| 3,401,830 | 9/1968 | Mathews | 221/2 |
| 3,403,380 | 9/1968 | Welch | 340/149 A |
| 3,436,736 | 4/1969 | Platt | 340/172.5 |
| 3,453,598 | 7/1969 | Schweizer | 340/149 A |
| 3,465,131 | 9/1969 | Ten Eyck | 235/61.11 D |
| 3,652,829 | 3/1972 | Hayakawa | 235/61.12 M |
| 3,665,162 | 5/1972 | Yamamoto | 235/61.7 B |
| 3,691,350 | 9/1972 | Kuhns | 235/61.7 B |
| 3,697,729 | 10/1972 | Edwards | 235/61.7 B |
| 3,740,530 | 6/1973 | Hoffer | 235/61.7 B |
| 3,764,742 | 10/1973 | Abbott | 178/22 |

*Primary Examiner*—Daryl W. Cook
*Assistant Examiner*—Robert M. Kilgore
*Attorney, Agent, or Firm*—Hammond & Littell

[57] ABSTRACT

The invention relates to a method of control of legitimacy safe against forgery using at least two documents provided with bits of information, one of said documents being a document of identification, such as a check card or the like, the other one being a document releasing a function, such as a check or the like, said documents being commonly presented for releasing the function of the function document whereby said bits of information on each document are combined and verified for legitimacy before releasing the function.

13 Claims, 18 Drawing Figures

Patented Jan. 7, 1975  3,859,508

METHOD OF CONTROL OF LEGITIMACY SAFE AGAINST FORGERY

THE PRIOR ART

Different types of provisions for legitimacy for phsycial or juridical persons require differentiated documents of legitimacy, Such documents of legitimacy, for instance may be a passport, an identity card, or the like. For other functions of legitimacy, check cards, credit cards, or the like, are used. For certain purposes, for instance, a driver's license or identity cards issued by enterprises for their employees may be involved. Such identity documents usually are provided with the holder's name and other personal details. Moreover, they may be provided with the holder's name and other personal details. Moreover, they may be provided with the holder's photograph and signature.

If, for the provisions of legitimacy, a single document of this kind is sufficient, forgery usually can easily be made. Even if for increasing the safety against forgery additonal, for instance, optically invisible and coded statements are included in the document of legitimacy, forgery is easily possible, because in the case of theft of a valid document of legitimacy, alterations of the photograph or the signature usually may not absolutely be excluded or even may not be required. For this reason, often several documents are used for different functions, which in combination only will effect sufficient legitimacy for a certain function. Thus, in the monetary trade, checks and check cards are used, or for crossing borders, passports and visas are employed, which only in combination will release the desired function. The safety against is thus increased, but it is still difficult and in some cases quite impossible to verify whether a document of legitimacy is used by the real holder and within the respective fields authorized by said legitimacy.

Thus, for instance, there is a need in a more safe way than was hitherto possible to exercise control of credit cards and money transactions connected therewith, for instance that the credit card is not forged or is illegally used by another person than the real holder, or that the function, i.e., in this case the limit of the credit authorized by the card, is not exceeded. Another object desirable in this connection is that it should be easier to follow up each transaction involved, irrespective of whether they are carried through manually or automatically.

For meeting this need, a great number of systems are already known ("Electronics", Mar. 29, 1971, pages 42 to 48) which facilitate the cashless trade in different ways. As described therein, verifying terminals are provided which perform certain controls. These controls, for instance, may consist in that bits of information about the maximum credit stored on magnetic strips in the credit card, possibly in code form, are compared with the claimed sum, that, in accordance with the result of the comparison, either the credit is refused or the claimed amount is delivered, and that possibly the coded statement on the magnetic strip is altered accordingly. Other verifying terminals are connected through the public telephone network or by other means with central computers which check the number of the credit card and the number of the account, determine the state of the account and release the amount claimed by means of the credit card in the case of the existance of the proper conditions. All of these systems have a relatively low safety against illegitimate use by persons other than the legal holder of the document.

Therefore, various methods are known by which the safety against forgery of legitimacy documents is increased. Thus, for slot-paying mechanisms, a method is known (German Published Application, DOS No. 2,119,491) wherein, for enchancing the safety of machine-readable check cards and machine-readable checks, a so-called validity code must be provided at a determined place on the check by the holder in order to make it valid. This code is then verified in a testing device concurrently with the verification of the check card and the check for issuing the special check required for the operation of the slot-paying mechanism. The special check will be delivered only if the validity code is placed on the check in the correct way. The drawback of this method consists in that the check card, the check and the validity code on the check have to be controlled. Moreover, an improvement of safety can only be achieved with slot-paying mechanism. In the normal monetary trade with bank offices, aboslute safety does not presently exist as before, because possibly even with a check provided with the validity code without simultaneous presentation of the check card, the payment at the counter of the bank office would be carried through, since all bits of information required for payment appears on the check. It has been found in practice that such payments in bank offices, which, indeed, are not in accordance with the existing system of safeguards are often carried through with known customers and result in an additional reduction of safety in the check trade. The same relates to credit cards or the like.

OBJECTS OF THE INVENTION

An object of the present invention is to provide a system for improvement of the safety in transactions with documents of legitimacy by a control of legitimacy safe against forgery and the necessary apparatus.

Anohter object of the present invention is to provide a method for the control of legitimacy safe against forgery comprising at least two documents provided with bits of information, one of said documents being a document of identification and another of said documents being a document releasing a function wherein the character bits of information required for the function of said document releasing a function is divided into two partial bits of information supplementing each other, providing one of said partial bits of information on said document of identification, and providing the other of said partial bits of information on said document releasing a function wherein at least one of said partial bits of information on one of said documents is determined by a mathematical function of the other partial bits of information on one of said documents, said mathematical function being provided on one of said documents, presenting said documents to a verifying terminal position, and verifying the complete bits of information required for releasing the function of the document releasing a function, being a combination of said two partial bits of information, by means of said mathematical function and releasing the function when said complete bits of information are verified.

These and other objects of the invention will become more apparent as the description thereof proceeds.

DESCRIPTION OF THE INVENTION

The drawbacks of the prior art and the above objects have been achieved by the development according to the invention in that in a method of the type as mentioned above the bits of character information required for the function of the document releasing a function is divided into two partial bits of information whcih supplement each other, one of said partial bits of information being provided on the document of identity while the other one is arranged on the document releasing the function, that further the partial bits of information on the document of identity is determined by means of a mathematical function also placed on the document of identity in a coder by the partial bits of information to be placed on the function document, and that, when the two documents are presented to a verifying terminal, the complete information required for releasing the function of the function document and consisting of the two partial bits of information is checked by means of the mathematical function.

The invention preferably consists of a method for the control of legitimacy safe against forgery comprising at least two documents provided with bits of information, one of said documents being a document of identification and another of said documents being a document releasing a function wherein the character bits of information required for the function of said document releasing a function is divided into two partial bits of information supplementing each other, providing one of said partial bits of information on said document of identification and providing the other of said partial bits of information on said document releasing a function wherein at least one of said partial bits of information on one of said documents is determned by a mathematical function of the other partial bits of information on one of said documents, said mathematical function being provided on one of said documents, presenting said documents to a verifying terminal portion, verifying the complete bits of information required for releasing the function of the document releasing a function, being a combination of said two partial bits of information, by means of said mathematical function and releasing the function wherein said complete bits of information are verified.

This method is preferably to be used in all such cases, wherein at least two documents participate in the control of legitimacy. For instance, the document of identity may be a passport, a check card, a credit card, or the like. The function document can be a visa, a travellers check, a banking check an air ticket, etc. Numerous applications exist. Thus, for instance, an identification card or the passport may be provided with partial bits of information and the mathematical function character, while the driver's license, the visa, or the like carries the other partial bits of information. By means of a simple test device the policemen will then be able to find out that the two documents belong together. Thus, the safety against forgery of a driver's license is considerably enhanced, since the driver's license must coincide with an information in the passport, the assignment of the partial bits of information to each other being coded by the mathematical function character. If each partial bit of information consists of a sufficient number of characters, it will rather be impossible, even with a computer and in the case of knowning all of the various applicable mathematical functions which can combine the partial bits of information with each other, to find out a corresponding ascertainment. Of course, the bits of information may be invisibly arranged in the documents. However, for certain applications, they also may be placed visibly on the documents. In both cases, it is possible to read the information by machine. In both cases, also the use of additional coding of the partial bits of information is easily possible to further increase safety. Since, for instance, the check carries only a part of the information required for cashing, a bank clerk will now not be able anymore, even with a customer known to him, to pay the amount withot presentation of the check card. Where by the Government, by enterprises, social security, and the like, monetary payments are made by check for cash payment, it will be sufficient to provide the check transmitted by mail and thus particularly endangered to theft, with partial bits of information and to transfer the other partial bits of information required for cashing by means of an identification document of the authorized receiver of the payment to the check for completion. As found, checks do not contain any reference to the mathematical function character, it is impossible to produce a check card matching with the check. In just the same way, it will be impossible to assign a visa of an illegitimate holder to a passport not belonging to the visa. It is possible to interconnect all documents of legitimacy issued by the authorities by suitable division of the bits of information, so that in this case, too, forgery will be impossible to the greatest extent.

The method, by which this safety against forgery is achieved, is very simple. The partial bits of information on the document of identity determines the other partial bits of information in a coder by means of the mathematical function character likewise provided on the document of identity, said other partial bits of information being arranged on the document releasing a function and supplemented by the partial bits of information of the document of identity to obtain the total information which is required for releasing the functions of the document releasing a function. The coder appropriately checks as to whether the total information thus obtained is clearly differentiated from all the other partial or total bits of information of its system already delivered, and simultaneously supplies the established partials bits of information on the document releasing a function. Division of the total information required to release the function of the document releasing a function into two partial bits of information makes each document alone ineffective in legitimacy. At presentation of the two documents for legitimacy, the total information combined of the partial bits of information can be checked in regard to its validity in a simple verifying device by means of the mathematical function character.

The method can easily be used toether with the securities hitherto used (photograph, signature, number of account, control of the state of the account) and without further efforts. Therefore, systems of legitimacy documents already employed can be further improved by using the described method of ocntrol safe against forgery. It will be sufficient to equip the issued documents accordingly and to use a simple verifying device which can be produced at low costs. Moreover, by the safety thereby obtained, control efforts often performed in a technical and methodical respect which, nevertheless, could not achieve absolute safety, will become unnecessary, so that in regard to the overall costs, saving will result.

The method indicted above, substantially diminishes the risks of illegitimate use of such documents, as seen from the viewpoint of forgery as well as in other respects. The new system gives the legitimate holder a new improved portection. To the authority, social security, bank office or the like, issuing the document of legitimacy, the method means that a very accurate calculation of risk can be made. Considering that, for instance, in 1969 from the approximately 10 million lost or stolen credit cards in the United States, one million were illegally used and resulted in a damage of $1,000,000,000, it is to be recognized to which importance the proposed method also may have in connection with calculations. The savings resulting alone from the impossiblity of illegitimate use of credit cards will greatly exceed the value of the investments required for the introduction of the method.

Moreover, errors of the type as described above in connection with the prior art, will not be possible anymore, as, for instance, the check alone without simultaneous presentation of the check card will not enable the bank office to pay even by way of fair obligingness, because the check does not contain all the data required for payment. In the same way, in crossing international borders, a visa will become effective only in connection with the travel document (such as a passport or passcard) belonging thereto, etc. With te documents assigned to each other, like check and check card, in spite of the considerably enhanced safety, it will not be necessary to increase the costs. The entire method can be performed with extremely simple and cheap devices which moreover, can easily be operated.

The invention will now be described with reference to the accompanying drawings, and, moreover, general explanations of suitable means for the practical exploitation of the invention will be given.

In the following specification, it is assumed that for legitimacy in connectin with any transactions two documents are used, e.g., an identity document, such as a check card, and a function document, such as a check. Of course, more than two documents may be combined to each other in the way as described below for securing safety against forgery. Further, it is possible to use various kinds of documents. For simplicity's sake, in the following specifcation only a check card and a check are concerned.

Figure 1:
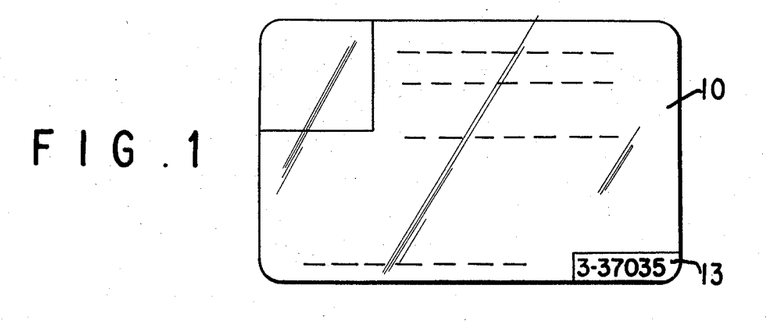
FIG. 1 shows a simplified view of a document of legitimacy, the so-called document of identity or the identification key.

FIG. 1 shows a check card 10. Such a document of identification can be designed in a countless number of ways and can have different shapes. Often it may be useful to provide it with a photograph of the holder or other means for identification of the same, such as, for instance, the signature of the holder. The check card 10 may further be provided with details on the person of the holder, the issuing bank office, etc.

Figure 2:
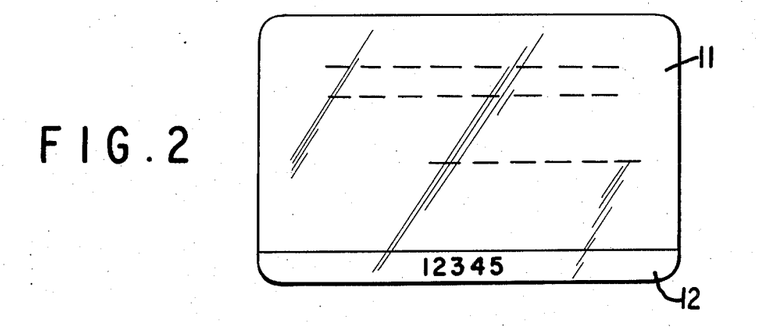
FIG. 2 shows a simplified view of the function document belonging thereto or the identity lock.

FIG. 2 shows a check 11 which also may be designed in any way, and which also contains information on the issuing bank office, the person of the payee, etc. In order to cash the check in addiiton to the presentation of the check 11, also the presentation of the check card 10 is required. However, up to the present, it is usual that both of the documents are provided with complete information, for instance, with the number of the payee's account, so that the check itself already contains all statements required for cashing. Thus, the check card will only provide safety insofar as by comparing the photograph and/or the signature on the check card 10 with the person presenting the check 10 or the signature of this person on the check, a certain checking possibility will exist. Also, additional controls on check and check card belonging to each other may be provided. This, however, does not change the fact that on principle the check itself already contains all information required for cashing, by which illegal use is favored.

Now, it is proposed to divide the total information required for cashing the check 11 in two partial bits of information, one of said partial bits of information being provided in a zone 12 on the check, and the other one in a zone 13 on the check card.

The partial bits of information arranged on the check card 10 and on the check 11 in the zones 12 and 13 may be optically visible or invisible. It is further possible to arrange, for instance, the partial bits of information on the check 11 optically visible, while the partial bits of information on the check card 10 supplementing the partial bits of information on the check 11 to obtain a total information may be invisible. In the example shown in the drawings, the partial bits of information consist of numerical characters with five or six positons. Any other type of dividing the total information and any suitable number of positions will be possible.

Moreover, the partial bits of information may be arranged in a great number of other ways on the check card 10 and the check 11. Any other characters than digits, namely, notchings, hole punched strips, area codes, etc. may be used as well. There are numerous possibilities. Particularly suitable is the employment of magnetic recordings of the partial bits of information.

On principle, dividing the total information in two partial bits of information could also be imagined which only togethr and completed to a total information would release the function of the check 11. HOwever, in order to include an additional possbility of control which moreover is simple in regard to method and technical performance, the two partial bits of information are in a certain relation to each other which is determined by a mathematical function character. In the present case, the mathematical function character is arranged in the zone 13 of the check card 10. It is digit "3". In this case, for instance, the mathematical function character determines that the partial bits of information in the zone 12 of the check 11 must be multiplied by 3 to obtain the partial bits of information of the check card:

$$\begin{array}{r} 12345 \times 3 \\ \hline 15 \\ 12 \\ 9 \\ 6 \\ +3 \\ \hline 37035 \end{array}$$

Of course, it is also possible to determine other mathematical functions with other factors by the function character. There are numerous possibilitites existing. Moreover, it is possible to arbitrarily select the function character and to use, for instance, any of the digits of the partial bits of information. For this, too, numerous possibilities exist which can be exercised with modern electronics in a simple mechanical way.

It is of condsiderable importance that the mathematical function character is recorded in that partial bits of information were coded by means thereof. Thus, forgery is rendered much more difficult, as with the mathematical function character, the recalculation from the result, i.e., the partial bits of information recorded adjacent to the mathematical function character, to obtain the initial figure will hardly be possible. The safety against forgery will be further increased by including the mathematical function character in the partial bits of information or by using a digit of the partial bits of information as a mathematical function character. Alternatively, it is also possible to arrange the coded partial bits of information with the mathematical function character on the check 11 and to arrange the partial bits of information which in coding is subjected to an arithmetic operation on the check card 10.

Figure 3:
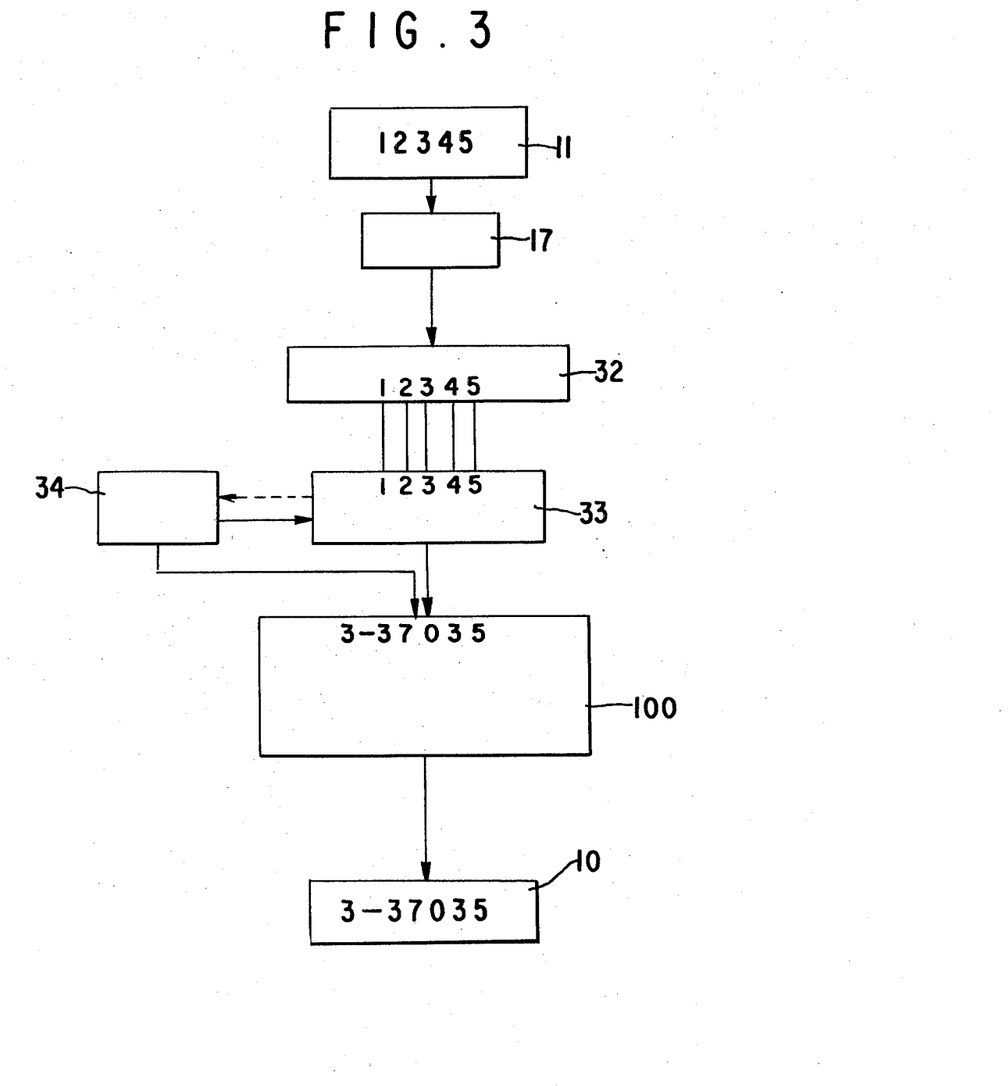
FIG. 3 shows partly in the form of a block diagram, a coder for determining the partial bits of information on one of the two documents, starting from a predetermined partial bit of information on the other one of the two documents.

FIG. 3 shows a device which makes it possible with a check 11 provided with predetermined partial bits of information to determine the corresponding partial bits of information for the check card and to dispose these partial bits of information on the check card. At first, the partial bits of information on the check 11 is read by means of a reader 17 and transferred, for instance, to a shift register 32. The shift register 32, in turn, supplies the data representing the partial bits of information on the check 11 to an arithmetic function memory 33, the arithmetic operation of which exercised with the supplied digit being determined by a function selector 34. The function selector 34 can allow the selection of a determined mathematical function through a keyboard. It is also possible to perform an accidental selection of the mathematical function by means of a digit search action by an oscillator with the mathematical function character just selected at the end of oscillation of the oscillator being detained. It is further possible, in the way as shown in broken lines in FIg. 3, to let the function selector 34 search among the digits stored in the arithmetic function memory 33 for a suitable mathematical function character. The mathematical function character selected by the function selector 34, in the present case the digit 3, is returned from the function selector 34 to the memory 33 and determines the artithmetic function performed with the numbers stored therein. In the present case, as described above, a multiplication by the factor "3"is concerned. This multiplication is carried through digit by digit, and the result 37035 is supplied to a printer 100 which further receives the function character 3 selected by the function selector 34. The printer 100 transfers the partial bits of information applied thereto by any means, for instance, by means of a magnetic record to the check card 10 which thus shows the partial bits of information which supplements the partial bits of information on the check 11 to a total information and comprises a further possibility for control which consists in that the application of the artithmetic function characterized by the mathematical function character on the check card to the partial bits of information arranged on the check must result in the partial bits of information on the check card. Alternatively, the arrangements may also be interchanged. It is further possible to provide a further control device which prevents that on coding mentioned above, to produce the partial bits of information, such partial bits of information are selected which together result in a total information which possibly may have been issued already to another customer of the bank office and characterizes the number of the account thereof or the like. Since coding is performed at the issuance of the check card 10 and the check 11, it is easily possible to include an additional safety of this kind by means of the computer of the bank office. The coder described moreover is simple and cheap in production. Still more moderate in price are the verifying terminals which make possible the control itself.

Figures 4, 5:
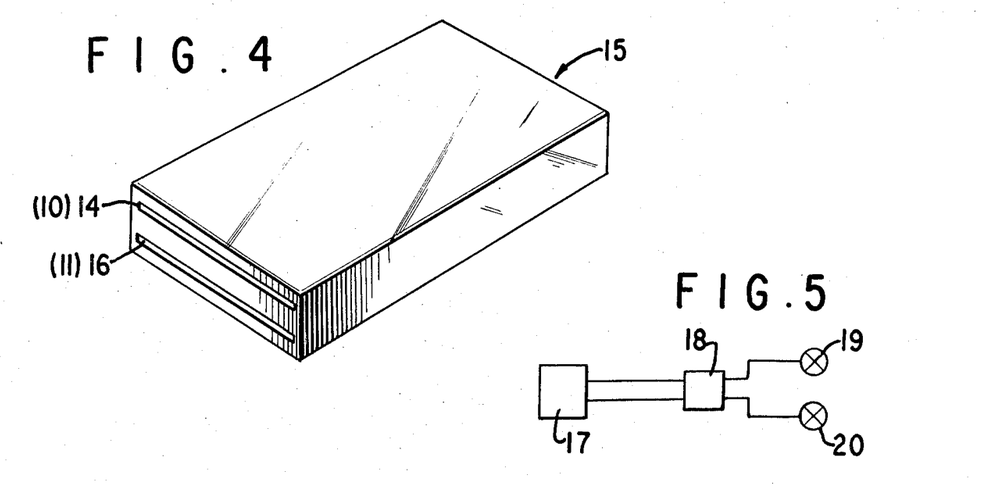
FIG. 4 shows a perspective view of an embodiment of a device for transferring the partial bits of information from the first document to the second document.
FIG. 5 shows partly in the form of a block diagram a verifying terminal for rating the information supplied by the device according to FIG. 4.

FIG. 4 shows schematically an embodiment of a device 15 with slots 14 and 16 wherein, as indicated in the drawings, the check card 10 on the one hand and the check 11 on the other hand can be inserted. In the device 15, after the two documents having been inserted, the partial bits of information of the check card 10 is transferred to the check which is now provided with the total information including the mathematical function character.

FIG. 5 shows a device to which the check 11 now containing the total information is supplied. A reader 17 reads-out this total information from the check by machine and transfers the total information read-out to a comparator 18 for rating. The comparator 18 checks whether the total information composed of the partial bits of information of the check card 10 and the supplementary partial bits of information of the check 11 shows a predetermined form and whether the partial bits of information are combined in the way as predetermined by the mathematical function character. If this is the case, the payment is approved: a green lamp 19 is lighted. If, contrary thereto, any of the digits within one or the other group of digits is not in conformity with the predetermined scheme or the partial bits of information are not in correct connection with each other as predetermined by the mathematical function character, the monetary transaction cannot be carried thorough, because apparently the check card 10 and the check 11 are not correct for any reason or do not belong to each other. The location of the error results in the lighting of a red lamp 20. Any other indicating means excluding the discrimination of the bank office personnel may be used as well. Alternatively, the comparator can be used in all such cases where checks and check cards are received, for instance, in warehouses, airports, hotels, etc. The devices of FIGS. 4 and 5 may also be combined to a unit verifying terminal. This device will not require much space, it is cheaply produced and simple in operation. In monetary transactions approved by the control device, the transfer of the partial bits of information of the check card to the check can also serve the purpose of a receipt in the transaction.

From what has been described above, it is evident that the check card 10, i.e., the document of identification, serves as a kind of identity key, while the check 11, i.e., the function document which may also be a contract, a travelling ticket, a visa or a document of any similar function, represents the lock operated by the identity key. It is understood that it may also be possible not to transfer the partial bits of information from the identification document to the function document and only to mechanically check the correlation of the information or to mechanically analyze the partial bits of information of the identification document. It is of importance that the partial bits of information supplementing each other are applied to separate documents and that the cooperation between the partial bits of information as a total information tkes palce in any case in such a manner that the total information is based on the combination of the partial bits of information of both documents. However, as indicated later, it is also possible to have the total information on one document which is verified in a verifier.

Figure 6:
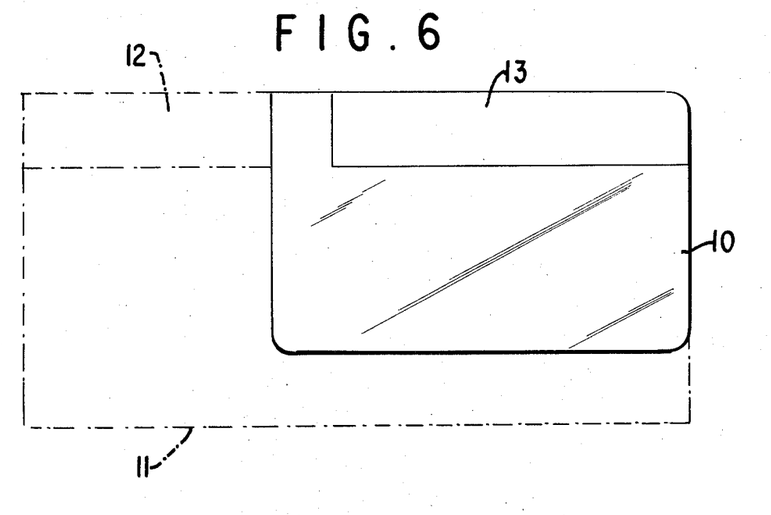
FIG. 6 shows schematically an identity document arranged on the function document in correct position for transfer of the partial bits of information.

FIG. 6 shows again the check card 10 with the zone 13 and the check 11 with the zone 12. In each zone 12 and 13 one of the partial bits of information supplementing each other to a total information is provided. For instance, a metallic material can serve this purpose which is suitable for the transfer of the recorded information. The information, for instance, may consist of holes in the metal (FIGS. 8, 9 and 11), areas with magnetic characteristics different from those of the surrounding areas, as well as elevations or cavities (FIG. 10). The information is stated in the form of ciphers, codes or as a fully written out text. For instance, by means of a magnetic field and the magnetic flow genetated thereby the partial information of the zone 13 of the check card 10, when the check card 10 and the check 11 are correctly superposed as shown in the arrangement of FIG. 4, can be transferred to the correct place of the zone 12 on the check 11.

Figure 7:
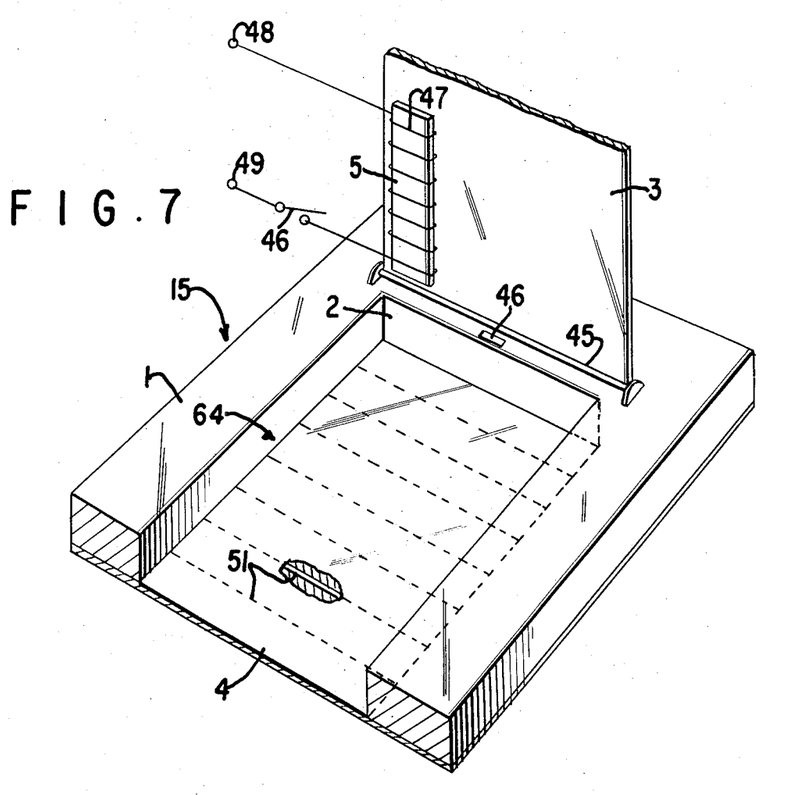
FIG. 7 shows in a perspective view and in detail a device for magnetic transfer of the partial bits of information from the identity document to the function document.

FIG. 7 shows an embodiment of the device 15 for combining the partial bits of information on one of the two documents. A box 1 of non-metallic material has a depression 64, wherein the check 11 is disposed which thus abuts at a grid plate 4. In the manner shown in FIG. 6, the check card 10 is put on top of the check 11. One corner, e.g., corner 2 of the depression 64 in the box 1 serves to correctly hold the documents in accurate position relative to each other and in relation to the device 15. The box 1 is provided with a lid 3, pivoting around a spindle 45 and provided with an electromagnet 5 having an operating range suitably corresponding to the lateral and lengthwise extension of the zone 13 of the check card 10. On lowering the lid 3 in such a manner that it covers the depression in the box 1 the lid actuates a microswitch 46 to switch on the current to the coil 47 in the electromagnet 5 from a current source which is connected to terminals 48 and 49 of the coil 47. Now, the electromagnet 5 has a magnetic field by which the partial bits of information of the check card 10 is transferred to the check 11 which is now provided with the total information for carrying through the monetary transaction, namely, with the partial bits of information of the check card 10 transferred from the check card 10 to the check 11 and the supplementary partial bits of information previously registered in the left part of the zone 12 on the check 11 (sse FIG. 6). NOw, the total information can be checked in a verifying device which thereupon approves or does not approve the monetary transaction.

The zone 12 of the check 11 carrying the information can consist of a magnetic strip or a sprayed area allowing the information transferred by the magnetic flow via the code markings in the information zone of the check card 10 to be stored in the zone 12 of the check 11.

Figure 8:
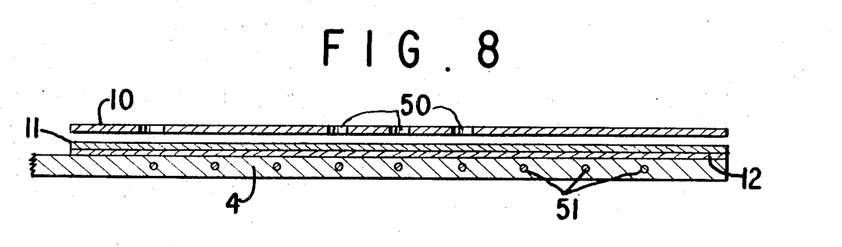
FIGS. 8 and 9 show an example of punched coding for magnetic transfer of information.

FIG. 8 shows a check card 10 of a magnetically shielding material, wherein the information in the zone 13 is constituted by punched holes 50. The check 11 is suitably provided with a zone 12 for receiving the partial bits of information. Here, the zone consists of a magnetic strip. The check 11 is resting towards the grid plate 4 of the device according to FIG. 7, which has wires 51 of magnetically conducting material arranged in interspaced distribution corresponding to the parting of the possible code holes 50 in the information zone of the check card 10.

Figure 9:
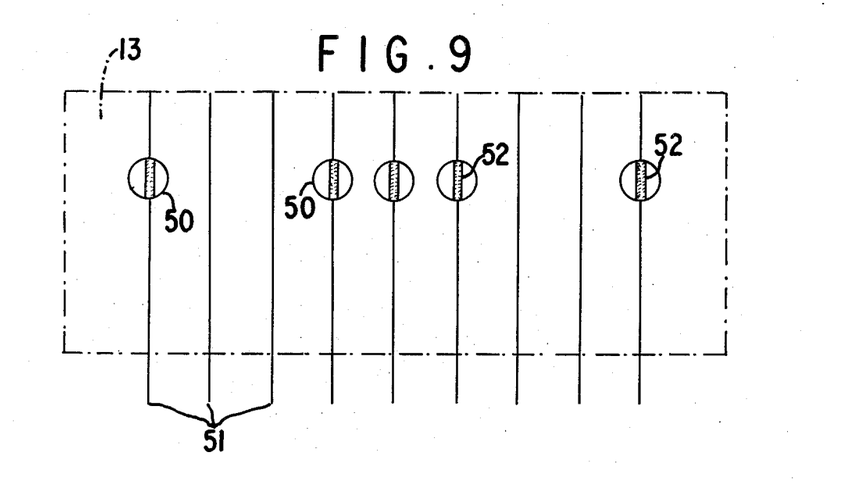
Figure 10:
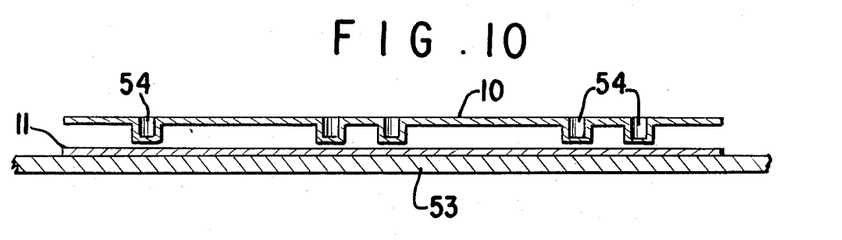
FIGS. 10 and 11 show other examples of magnetic transfer.

FIG. 9 shows how the arrangement of the holes 50 corresponds to the arrangement of the wires 51 in the grid plate 4. As is understood, such wires 51 give a concentration of the magnetic flow to narrow rod-like areas 52 which are effective respectively for each of the holes 50 provided in the check card 10 corresponding to the zone 12 of the check 11. The area around the rod-like areas 52 is thereby only weakly magnetized, so that a distinct marking of the code on the check is obtained also for the partial bits of information transferred from the check card 10 to the check 11.

The grid plate 4 is shown in the drawings as being provided with a series of parallel wires 51, but it is understood that additonal wires or series of wires could be arranged with the intersection points of said wires corresponding to possible coding holes 50 of the check card 10. The grid plate 4 can also be replaced by a magnetically conducting metal plate 53, if, as shown in FIG. 10, the information to be transferred from the check card 10 to the check 11 is constituted by elevations or, as shown n FIG. 10, by cavities 54.

In the above described example of a device 15 for the transfer of the partial bits of information from one document to the other, the information preferably is invisible and concealed. For this purpose, code holes, for instance, may be filled with a non-transparent material which, however, does not neutralize the effect of the code holes for the magnetic flow. Such an arrangement is described in the U.S. Patent Application Ser. No. 87,254, filed Nov. 5, 1970 now Pat. No. 3,731,085. The partial bits of information are magnetically stored at least on one of the documents. Also he transfer of the partial bits of information from one to the other document is performed magnetically. It is understood that for the magnetic transfer of the partial bits of information from one of the documents to the other one, different magnetic devices may be used as well, permanent magnets and electromagnets being suitable in the same way. The device 15 also may have another construction as that shown in FIG. 7.

Figure 11:
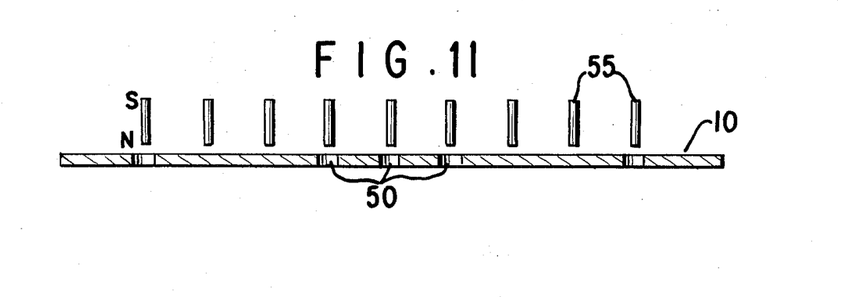

As an example, FIG. 11 shows an embodiment with small pin-like magnets 55, the number and arrangement thereof corresponding to the possible number of code holes 50 in the check card 10.

Figure 12:
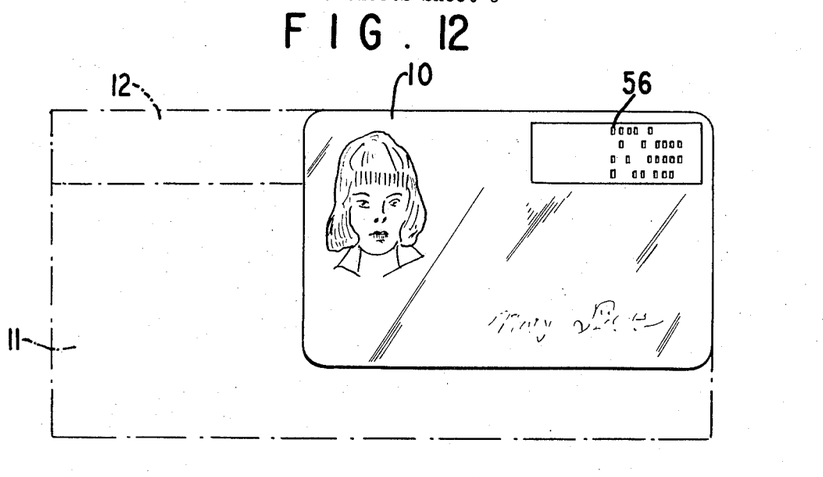
FIG. 12 shows a view similar to FIG. 6 when using an identity card with hole punched code strip or other optical code.

FIG. 12 shows another possibility. Therein additionally to the above described invisible, e.g., magnetic information an optically visible information is used. In the example shown, the check card 10 has a strip 56 of suitable material with punched holes. The hole strip 56 is incorporated in the check card 10. The information contained therein can be transferred by optical means known per se, e.g., by means of a photostatic device, from the check card 10 to the check 11. After transfer, the total information is then on the check 11 and can be read therefrom by machine, e.g., by means of an optical reader. In transferring, those parts of the zone 12 on the check 11, to which the additional information shall not be transferred, are suitably covered in the device 15 by a mask.

Figure 14:
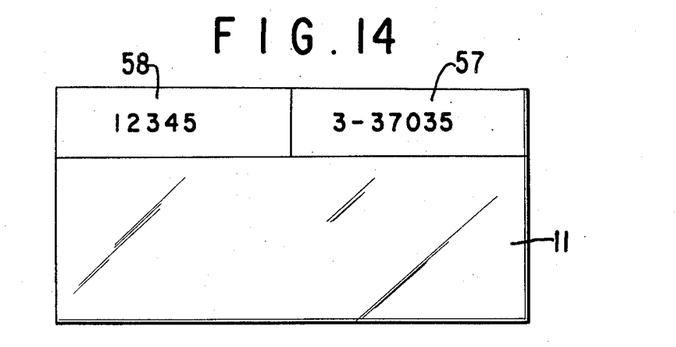

An alternative of the description above is that the check card 10, i.e., the identity document, can be provided with a isotape marking. In this case, the check 11 is provided with a photosensitive zone 57, i.e., a photographic emulsion, which, however, is protected against light by a covering strip. Alternatively, the check 11 can be provided with a section 58 of a fluroescent material (postive image). This fluorescent section 58 can also be supplemented by a photosensitive section 57. These sections would then be arranged as shown by FIG. 14.

The isotope markings of the check card 10 produce a negative image on the check 11, where the photosensitive section 57 has a fluorescent layer placed underneath. Thus, a fluorescent image of the partial information of the check card 10 will appear on the check 11. For reading a source of UV-light (not shown) is used.

Another particularly simple embodiment of the check card 10 and the check 11 can consist in a card of plastic coated paper, each of the two documents being provided with its partial bits of nformation in the form of a series of holes. These cards are commonly supplied to a verifying device which reads the punch coded bits of infromation fron the check card and the check, and combines them to the total information.

The cards intended for magnetic reading can be provided with metallic material, where they are printed with metallic ink. The metal may also be applied by the known metal dust precipitation method. An inlay of metal in the card will then not be required. The partial bits of information can further be applied to the cards in the form of holes heat-punched by means of laser-beams. Also the etching or galvanization methods known within the technique of printed circuits may be used for applying the partial bits of information. An alternative way of coding by chemical preparation of the identity document, such as the check card 10, or the function document, such as the check 11, is possible.

Figure 13:
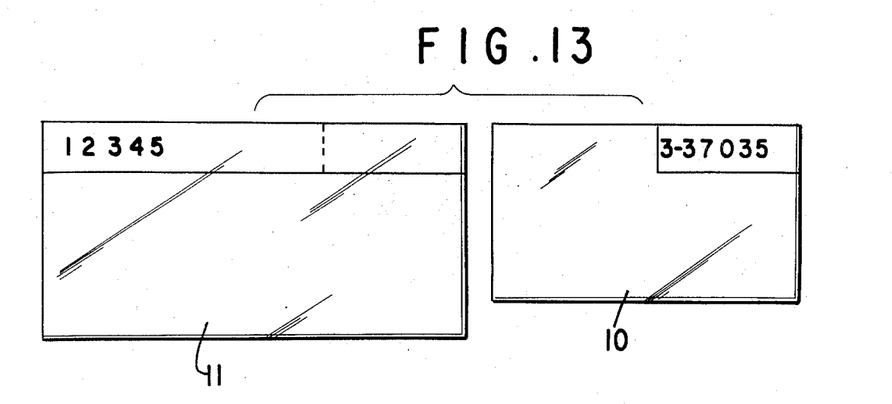
FIGS. 13 and 14 show examples of partial bits of information in digit marking.

FIG. 13 shows an example for the arrangement of the partial bits of information on the check 11 and the check card 10. The connection of the two partial bits of information and their combination by means of a mathematical function character, in this case the function digit 3, was already set forth above. FIG. 14 shows the check 11 after transfer of the partial bits of information from the check card 10 to the check 11.

Figure 15:
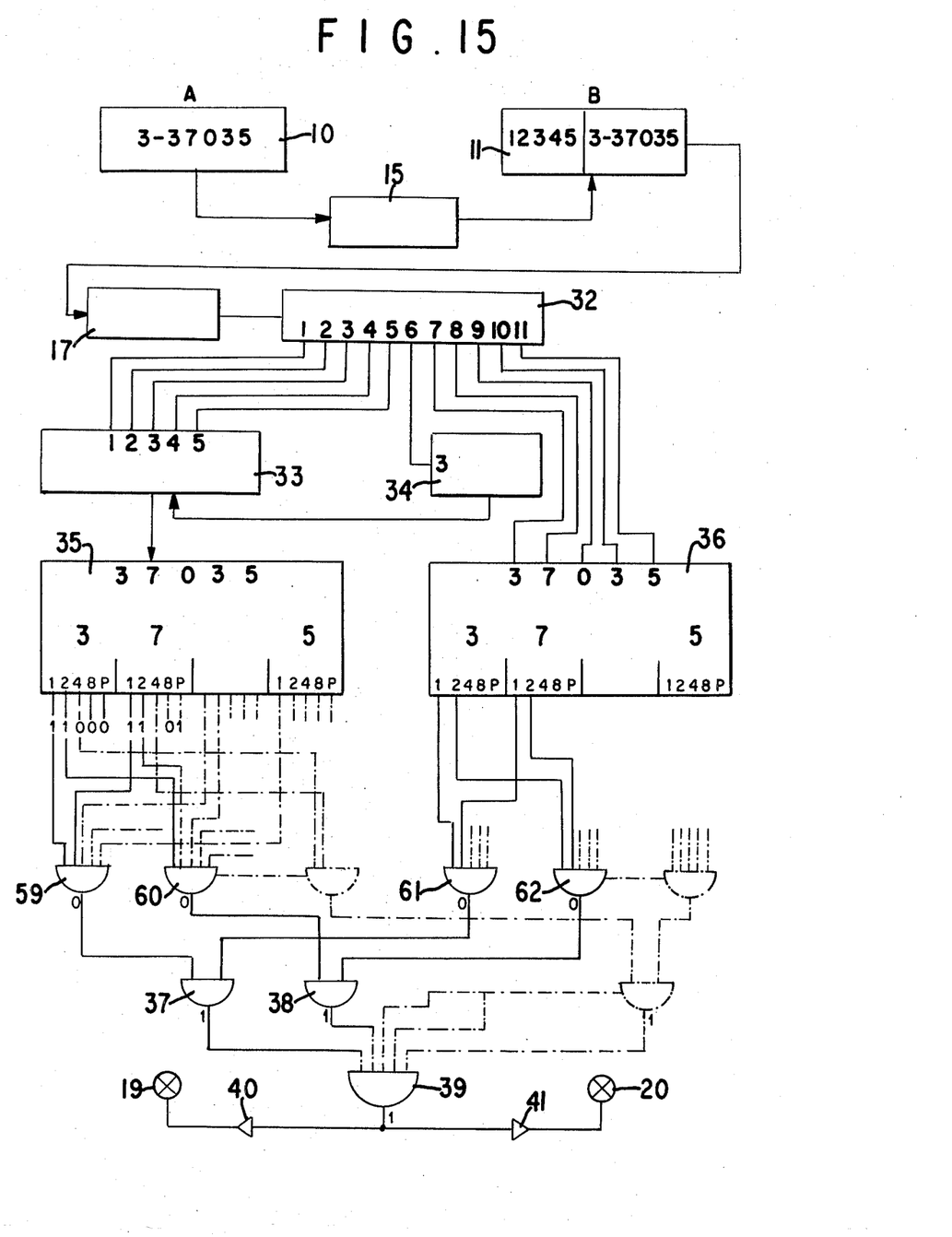
FIG. 15 shows a block diagram of a verifying terminal according to one embodiment of the invention.

FIG. 15 shows an embodiment of the verifying terminal used in the method of control of legitimacy safe against forgery, to which an identification document A and a function document B are supplied. At first, by means of the device 15, the partial bits of information 3 - 3 7 0 3 5 of the check card 10 is transferred to the check 11 which is provided with the partial information 1 2 3 4 5 which with the application of the function digit 3 to this digit group (multiplication by the factor 3) results in the other partial bits of information. Now, the check 11 is provided with the total information which consists of the partial information 12345 which from the beinning was existent on the check, as well as of the function character 3 and the partial information 37035 which were transferred to the check 11 in predetermined arrangement from the check card 10. The resulting total information with eleven positions including the function digit is read by means of the reader 17 to a shift register 32, where each position has its own exit. The information of the five first positions 1 to 5, which is the partial information 12345 of the check 11, is transmitted to a primary arithmetic function memory 33, while the information of the positions 7 to 11, which is the partial information of the check card, is transmitted to a second shift register 36.

The function memory 33 is triggered in regard to the arithmetic function to be carried through by a function selector 34 to which the mathematic function character in the sixth positon of the shift register 32 is transmitted by said shift register. Since thus the function memory 33 receives through the function selector 34 the mathematical function character "3" which encodes the command to multiply the input of the function memory 33 by the factor 3, the function memory 33, by multiplication digit by digit and addition of its input, genernates the product 37035 which is applied to a further shift register 35. Now, the shift registers 35 and 36 each contain five digit positions which, as the check card 10 and the check 11 belong to each other, respectively show the digits 3, 7, 0, 3 and 5. Each digit position is divided in five binary positions which (see FIG. 15) are denoted 1, 2, 4, 8, and P, respectively (=parity).

The binary positions 1 of all the five digit positions of the shift register 35 are connected as inputs to a gate 59. Likewise, the binary positions 2 are connected as inputs to another gate 60. This is also the case with the postions 4, 8 and P. In the same way, the binary positions of the shift register 36 are connected to gates 61, 62, etc. Further, the gates 59 and 61 respectively connected to the first binary positions of the shift registers 35 and 36 are connected in turn as inputs to a common gate 37. This also relates to binary position 2 and the gates 60 and 62, respectively, in regard to a gate 38. Details are shown in the drawing. The outputs of the gates 37, 38, etc. in turn are inputs of a gate 39, the output of which is connected through amplifiers 40 and 41, respectively, to a green lamp 19 and a red lamp 20 (see FIG. 5).

The operation of the device is as follows:

If the shift registers 35 and 36 have stored the same digits 3, 7, 0, 3, 5 in binary form (0011, 0111, 0000, 0011, 0101), as indicated in the drawings, the gate 59 which, like the other ones, is an AND-gate, receives the inputs corresponding to position one, that is the input signal 11011. In the same way, the gate 60 receives the input signal 110101, etc. This also relates to the gates 61, 62, etc. Thus, the gates will have an output signal 0, as indicated in the drawings. This means that the gates 37 and 38 have input signals 0 at both inputs and therefore supply an output signal 1 which, as all input signals applied to the gate 39 conform to each other, results in an output signal 1 also at the gate 39. the amplifiers 40 and 41 are designed in such a manner that in this case the amplifier 40 will light the green lamp 19, so that the correct conformity between the identity document A and the function document B is indicated.

If, on the other hand, the digits stored in the shift, registers 35 and 36 do not conform to each other, an output 0 will appear at the gate 39 which, by means of the amplifier 41, effect lighting of the red lamp 20. Thereby, there is indicated that an error exists; either the identity document A or the function document B is incorrect or the two documents do not harmonize. The circuit following the gate 39 is only schematically indicated.

Figure 16:
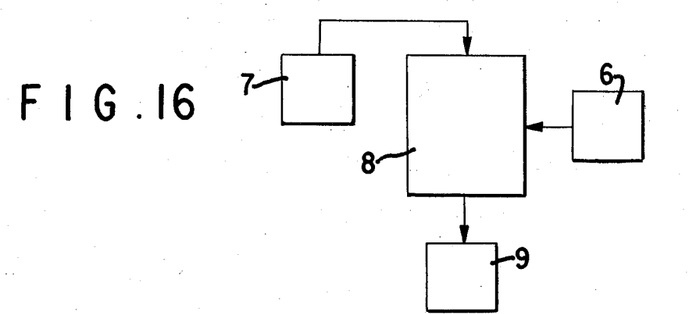
FIG. 16 shws a block diagram of a coder for coding travellers checks for delivery in a bank office.
Figure 17:
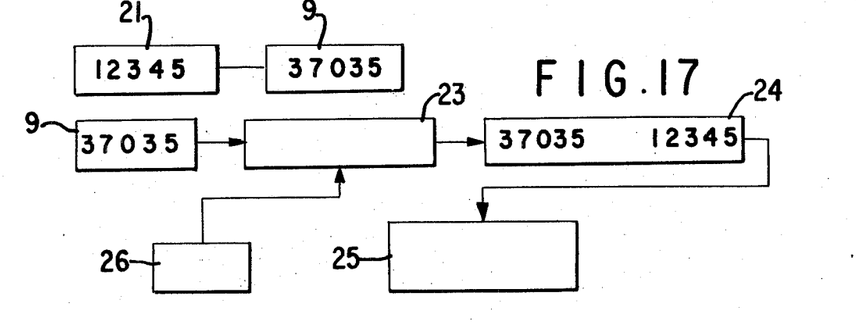
FIG. 17 shows a block diagram of a device for control of travellers checks on cashing in a bank office.

FIGS. 16 and 17 shall explain the employment of the method of control of legitimacy safe against forgery in the case of common presentation of assports as identification document A and travellers checks as function document B.

FIG. 16 shows a coder 8 as used in bank offices for coding travellers checks. The travellers check 7 is supplied to the coder 8. Further, by means of a keyboard 6 the coder receives the passport number of the customer. Now, the coder selects a function digit according to any system. This function digit can be permanently incorporated in the coder 8 or may be selected in the coder and change at random from one customer to the next. The coder can also select any of the digits of the passport number of the customer as function digit. By means of this function digit, the passport number of the customer will now be encoded and the coder 8 will print the coded partial bits of information including the mathematical function digit on the travellers check 7 and deliver the ready travellers check 9 which now carries the function digit and the coded passport number of the customer. Thus, in this case, different from the case described above in connection with FIG. 3, the identity document is not provided with a coded digit, but a partial bits of information corresponding in code form to the number of the identity document is produced and printed on the check together with the mathematical function digit. Basically, however, this is the same in both cases, because here, too, for cashing the travellers check the partial bits of information contained on the passport (non-coded passport number) and the digit code printed on the travellers check must be combined to a total information which is checked in regard to its validity by means of the mathematical function digit.

FIG. 17 shows an embodiment of a verifying terminal as it may be used in bank offices for the control on cashing travellers checks. A passport 21 with the passport number 12345 and a ready travellers check 9 with the digit code 37035 are presented to the bank office by the customer. The ready travellers check 9 is inserted in device 23 which may conform with that described above in connection with FIG. 7. The number of the passport 21 is likewise supplied by means of a keyboard 26 to the device 23 which then removes the travellers check 24 provided with a total information, which is then checked in a verifying device 25 with a reader (see above FIG. 5). As in all cases, when using the method of control in the way that the partial bits of information are transferred from one document to the other one, in this case, too, only one document, namely, the function document i.e., in this case the travellers check authorizing the payment, must be checked in the verifying device. The examination in the verifying device is carried through under utilization of a fixed function digit which corresponds to that of the coder 8. Alternatively, also the second digit of the respective passport number can be used as function digit. In this case, it will be sufficient to assign to all digits from 0 to 9 a predetermined arithmetic function, e.g., addition, subtraction, multiplication by predetermined factors, division of predetermined divisors, etc. Operation could also be made with more complicated functions, such as extraction of roots, extracting the cube root, forming the logarithm, etc. When it is not decided as to which one of the digits of the passport number is the function digit and this digit has been selected accidentally in the coder 8, the verifying device 25 controls in order each digit in the passport number on the assumption that one of the digits constitutes the function digit. The assumption is now that the first digit in the passport numer on control is shown to be incorrect, i.e., it is not the function digit, nor is the second digit. On control of the third digit of the passport number as function digit, however, the verifying device finds out (see above description in regard to FIG. 15) that the utilization of the function digit 3 in a "multiplaction by the factor 3" will bring the passport number to the coded partial information 37035 which was applied to the travellers check by the coder 8. It is to be noted that the coder 8 and the verifying device 25 can greatly conform.

Figure 18:
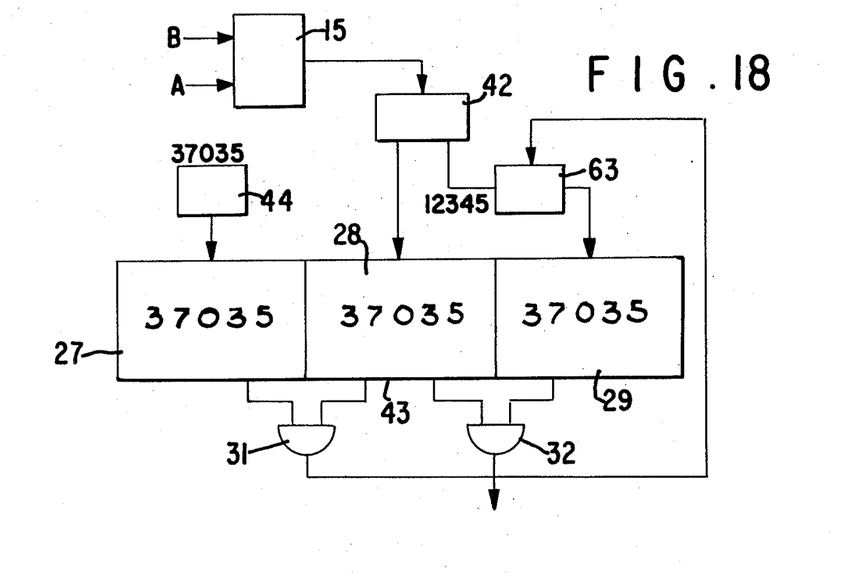
FIG. 18 shows another embodiment of the invention.

FIG. 18 shows schematically an application of the described method of control in connection with a slot machine. An identification document A and a function document B are respectively inserted in slot openings 14 and 16, respectively, of a device 15 according to FIG. 4. In this device 15 the function document is provided with the partial information 37035 invisibly provided on the identification document A. Thereupon, it is inserted in a reader 42. Alternatively, the reader 42 can be allowed to derive the partial bits of information of the documents A and B directly from the device 15. The partial information 37035 of the identification document A is applied by the reader 42 to a memory 28 of a central unit 43. Said unit is connected with another memory 27, to which the passport number (identification document A) can be applied by means of a keyboard 44. Now the information stored in the memories 27 and 28 are compared digit by digit, as described above, to ascertain whether the visible passport number and the number invisibly, e.g., magnetically recorded in the passport, coincide. If this is the case, a signal is received at the gate 31 which operates an arithmetic function memory 63. At the input thereof the partial information 12345 derived from the function document B is apppplied. Now, this input is multiplied in the function memory 63 by the factor 3. The result is supplied to another memory 29 of the central unit 43. Now, the information in the memories 28 and 29 are compared. Thereupon, since the stored figures coincide digit by digit, the gate 30 supplies a signal which approves the intended transaction. In detail, comparing can be carried through in similar way as previously described in connection with FIG. 15.

It is still to be noted that the identity document and the function document can be exchanged in their functions. It is further at option which one of the documents carries the coded and which one the non-coded partial bits of information which combined will make up the total information. It will also be possible to decide according to suitability, form which document the partial bits of information shall be transferred to the other document or by which other means the partial bits of information shall be supplemented to obtain the total information. Thus, for instance, it is possible, for reason of simplification, e.g., in the monetary trade, to combine the two documents to a single document which then contains one of the partial bits of information as fully written text and the other one containing the function character in invisible form. There, safety against forgery does likewise exist. The verifying terminal according to FIG. 3 may be modified in this case in such a manner that the reader 17 only reads the invisible partial bits of information of the single document, while the fully written information is applied by means of a keyboard. This makes it necessary to appropriately divde the memory 32 according to FIG. 15 in two memories, one of which is supplied by the reader 17 and the other one by the keyboard, and one of which feeds the function memory 33 and the other one the shift register 36. Alternatively, a reader 17 may be used which comprises a reading device for the fully written information and another reading device for the invisible partial bits of information, which then are combined in the shift register 32 (FIG. 3) to the total information.

Broadly, therefore, the present invention relates to a method for the control of legitimacy safe against fraud and forgery comprising at least one document releasing a function provided with bits of information, said bits of information being divided into at least two partial bits of information supplementing each other wherein at least one of said partial bits of information is determined by a mathematical function of the other partial bits of information, said at least two partial bits of information being provided to said at least one document by different technologies, mechanically reading at least one of said partial bits of information, mechanically verifying said at least two partial bits of information by means of said mathematical function and releasing the function on said verification.

The preceding specific embodiments are illustrative of the practice of the invention. It is to be understood, however, that other expedients either disclosed herein or known to those skilled in the art, may be employed without departing from the spirit of the invention or the scope of the appended claims.

We claim:

1. A method for the control of legitimacy safe against forgery comprising at least two documents provided with bits of information, one of said documents being a document of identification and another of said documents being a document releasing a function, wherein the character bits of information required for the function of said document releasing a function is divided into two partial bits of information supplementing each other, providing one of said partial bits of information in said document of identification and providing the other of said partial bits of information on said document releasing a function, wherein at least one of said partial bits of information on one of said documents is determined by a mathematical function of the other partial bits of information on one of said documents, said mathematical function being provided on one of said documents, transferring said partial bits of information on said document of identification to said document releasing a function, whereby the document releasing a function contains the complete bits of information required for releasing the function, presenting said document releasing a function to a verifying terminal position, verifying the complete bits of information required for releasing the function of the document releasing a function, being a combination of said two partial bits of information by means of said mathematical function ad releasing the function when said complete bits of information are verified.

2. The method of claim 1 wherein said mathematical function is provided on said document of identification.

3. The method of claim 1 wherein said mathematical function is comprised in one of said partial bits of information.

4. A system for the control of legitimacy safe against fraud and forgery, said system comprising,
  1. a document of identification carrying partial bits of information.
  2. a document releasing a function carrying partial bits of information, wherein one of said partial bits of information is determined by a mathematical function of the other partial bits of information, said mathematical function being provided on one of said documents,
  3. a means for transferring said partial bits of information on said document of identification to said document releasing a function,
  4. a means for reading the total information on said doucment releasing a function, which total information is composed of the original partial bits of information on said document and the partial bits of information transferred thereto from said document of identification,
  5. verifying means for verifying said total information by means of said mathematic function, and
  6. means for releasing said function upon verification.

5. The system of claim 4 wherein said means for transferring said partial bits of information on said document of identification to said document releasing a function is magnetic field transferring means.

6. The system of claim 5 wherein said magnetic field transferring means comprises a grid plate with parallel wires to which said two documents are superposed one on top of the other, said document of identification being remote from said grid plate and consisting of magnetically shielding material being provided with holes corresponding to the partial bits of information are transferred, said document releasing a function being below said document of identification, the magnetic field of a magnet arranged on top of said document of identification reaching said wires through said holes for obtaining a magnetic field concentration on rod-like areas, wherein said partial bits of information are transferred to said document releasing a function.

7. The system of claim 6 characterized in that said holes are filled with a magnetically non-shielding material and are thus optically invisible.

8. The system of claim 4 wherein said means for transferring said partial bits of information on said document of identification to said document releasing a function is an isotopic marking of said bits of information on one of said documents.

9. The system of claim 8 wherein said photosensitive zone is covered by an opaque against light strip.

10. The system of claim 8 wherein a fluorescent area is provided to adjacent said photosensitive area.

11. The system of claim 4 wherein said means for reading supplies one of the partial bits of information directly to a memory means and said for reading supplies the rest of the partial bits of information through a function memory means operated by said mathematical function to a second memory means and said verifying means is a circuit means for comparing the contents of the two memory means.

12. The system of claim 11 further comprising a shift register between said reader and said memory means.

13. The system of claim 11 characterized in that said function memory means checks the digits of its input information in regard to their usability as said mathematical function under consideration of the result of the comparison of the contents of the memories.

* * * * *